United States Patent [19]
Powers et al.

[11] Patent Number: 5,386,830
[45] Date of Patent: Feb. 7, 1995

[54] ULTRASONIC PULSED DOPPLER FLOW MEASUREMENT SYSTEM WITH TWO DIMENSIONAL AUTOCORRELATION PROCESSING

[75] Inventors: Jeffry E. Powers, Lake Stevens, Wash.; Thanasis Loupas, McMahons Point, Australia

[73] Assignee: Advanced Technology Laboratories, Inc., Bothell, Wash.

[21] Appl. No.: 142,784

[22] Filed: Oct. 25, 1993

[51] Int. Cl.$^6$ ............................................. A61B 8/00
[52] U.S. Cl. ........................... 128/661.09; 73/861.25
[58] Field of Search ...................... 128/660.01, 660.02, 128/660.06, 660.07, 661.01, 661.09; 73/861.25

[56] References Cited

U.S. PATENT DOCUMENTS

| | | |
|---|---|---|
| 2,053,841 | 9/1936 | Prescott . |
| 4,324,258 | 4/1982 | Huebscher et al. . |
| 4,509,525 | 4/1985 | Seo . |
| 4,573,477 | 3/1986 | Namekawa et al. . |
| 4,612,937 | 9/1986 | Miller . |
| 4,790,323 | 12/1988 | Leavitt et al. . |
| 4,799,490 | 1/1989 | Namekawa . |
| 4,800,891 | 1/1989 | Kim . |
| 4,803,990 | 2/1989 | Bonnefous et al. . |
| 4,896,674 | 1/1990 | Seo . |
| 4,905,206 | 2/1990 | Nishiyama et al. . |
| 4,928,698 | 5/1990 | Bonnefous . |
| 4,930,513 | 6/1990 | Mayo et al. . |
| 4,961,427 | 10/1990 | Namekawa et al. . |
| 4,972,838 | 11/1990 | Yamazaki . |
| 5,048,528 | 9/1991 | Superina et al. . |
| 5,121,364 | 6/1992 | O'Donnell ...................... 128/660.06 |
| 5,197,477 | 3/1993 | Peterson et al. . |

*Primary Examiner*—George Manuel
*Attorney, Agent, or Firm*—W. Brinton Yorks, Jr.

[57] ABSTRACT

A velocity estimation technique is provided for a pulse-echo ultrasonic diagnostic system in which a two dimensional array of samples is acquired from a sample volume. The two dimensions of the array are depth, in which echo signal samples are acquired in response to transmission of a pulse to the sample volume, and pulse time, in which samples are acquired in response to transmission of the pulses in the pulse ensemble to the sample volume. Two autocorrelation calculations are performed on the array, one in the depth dimension and another in the pulse time dimension to yield two correlation functions, the first related to echo frequency and the second related to the Doppler frequency. The two correlation functions are then employed in a Doppler velocity estimation to determine the velocity of motion at the sample volume. The technique utilizes the full information content present in the bandwidth of the received echo signals, thereby overcoming inaccuracies due to depth dependent frequency decline or coherent signal cancellation. Since accuracy is premised upon the number of samples in the array and not its size in a particular dimension, performance can be tailored to favor frame rate or axial resolution while maintaining the accuracy of velocity estimation.

19 Claims, 5 Drawing Sheets

|     | $P_1$ | | $P_2$ | | $P_3$ | | $P_4$ | |
|---|---|---|---|---|---|---|---|---|
| | $I_{11}$ | $Q_{11}$ | $I_{12}$ | $Q_{12}$ | $I_{13}$ | $Q_{13}$ | $I_{14}$ | $Q_{14}$ |
| | $I_{21}$ | $Q_{21}$ | $I_{22}$ | $Q_{22}$ | $I_{23}$ | $Q_{23}$ | $I_{24}$ | $Q_{24}$ |
| | $I_{31}$ | $Q_{31}$ | $I_{32}$ | $Q_{32}$ | $I_{33}$ | $Q_{33}$ | $I_{34}$ | $Q_{34}$ |
| C | $I_{41}$ | $Q_{41}$ | $I_{42}$ | $Q_{42}$ | $I_{43}$ | $Q_{43}$ | $I_{44}$ | $Q_{44}$ |
| | $I_{51}$ | $Q_{51}$ | $I_{52}$ | $Q_{52}$ | $I_{53}$ | $Q_{53}$ | $I_{54}$ | $Q_{54}$ |
| | $I_{61}$ | $Q_{61}$ | $I_{62}$ | $Q_{62}$ | $I_{63}$ | $Q_{63}$ | $I_{64}$ | $Q_{64}$ |
| | $I_{71}$ | $Q_{71}$ | $I_{72}$ | $Q_{72}$ | $I_{73}$ | $Q_{73}$ | $I_{74}$ | $Q_{74}$ |
| | $I_{81}$ | $Q_{81}$ | $I_{82}$ | $Q_{82}$ | $I_{83}$ | $Q_{83}$ | $I_{84}$ | $Q_{84}$ |

Z

ULTRASONIC PULSED DOPPLER FLOW MEASUREMENT SYSTEM WITH TWO DIMENSIONAL AUTOCORRELATION PROCESSING

This invention relates to ultrasonic diagnostic systems which measure the flow of fluids by pulsed Doppler interrogation and, in particular, to the processing of pulsed Doppler information signals using two dimensional autocorrelation.

Ultrasonic diagnostic systems which measure the flow of fluids through Doppler interrogation are in widespread use for the acquisition of medical patient data concerning the flow of blood and other fluids in the body. Doppler flow measurement systems may be characterized on the basis of the technique of ultrasonic wave transmission employed, which may be either continuous or pulsed wave transmission. In a continuous wave Doppler system a wave of ultrasonic energy is continuously transmitted toward the target area. Returning echo signals are compared in phase or frequency to the transmitted wave with the shift in phase or frequency being proportionate to the velocity of the target along the axis of transmission. In a pulsed Doppler system a sequence of ultrasonic wave pulses are transmitted toward the target area and the relative phase or frequency shift from one echo to another is calculated and is proportional to the velocity of fluid flow. The Doppler frequency shift $f_D$ is given by the Doppler velocity equation $$f_D = \frac{2V\cos\theta}{C} f_o$$

where $f_o$ is the frequency of the ultrasonic wave applied to the target, V is the velocity of the target which produced the echo, 0 is the angle of the axis of transmission relative to the direction of motion of the target, and C is the propagation velocity of the transmitted pulse. From this equation it is seen that the Doppler frequency shift $f_D$ is proportional to the velocity V of the moving target.

In pulsed Doppler systems the returning echo signals are generally not compared in phase or frequency to a specific continuous reference signal. Instead, the Doppler frequency information manifests itself in the repetition of the transmitted pulses, which are transmitted at sampling times $T_s$ and exhibit a repetition frequency known as the pulse repetition frequency or PRF. A sequence or ensemble of pulses produces a corresponding time sequence of data values for analysis. To extract the Doppler frequency information the received echo signals are analyzed as a function of $T_s$. Two common processors which serve this purpose are fast Fourier transform and autocorrelation processors. These processors are one dimensional, as the echoes received from each sample volume are reduced to one data value per pulse interval $T_s$. Examples of autocorrelation processing of Doppler signals may be found in U.S. Pat. Nos. 4,573,477, 4,905,206, and 4,930,513.

One current adaptation of Doppler measurement which makes intensive use of Doppler signal processing is color flow mapping. In color flow mapping, an area of the body such as the heart is repetitively interrogated with ultrasonic waves and returning echo signals are compared to determine the velocity of blood flow. This interrogation is performed over a two-dimensional sector of the heart to determine flow velocities at all of the points of flow in the sector, called sample volumes, throughout the interrogated area. The resultant flow velocity values are then displayed in a color image format as a function of measurement location, where different shades and intensities of color represent blood flow of different velocities and directions at each point in the image where flow is occurring. Color flow mapping systems provide a real-time color-encoded display of the mean axial velocity component of flow within each sample volume in the image.

In order to yield an accurate estimate of flow velocity in the foregoing Doppler velocity equation it is desirable to know as precisely as possible the frequency of the transmitted pulse, $f_o$. Since this frequency is meant to be the center frequency of the pulse which actually insonifies the sample volume, the transmitted pulse length is generally long, giving a narrow, sharply defined bandwidth to the transmitted pulse. However, this conventional narrowband approach to Doppler signal transmission runs contrary to the demands of B mode imaging, where broad bandwidths with high frequency content are desired for good axial resolution and accurate tissue signature identification.

A number of approaches have been proposed which are broadband in nature, thereby addressing the preceding shortcoming of narrowband processing techniques. These approaches estimate the axial velocity of moving targets by operating on a two dimensional data set of the received echo signals. One of these approaches, shown in U.S. Pat. Nos. 4,803,990 and 4,928,698, operates in the time domain by performing a crosscorrelation of successive lines of echoes taken rapidly along a common transmission axis. This technique looks for the peak of the crosscorrelation function corresponding to the best match between the two lines of echoes after a relative time shifting of the two lines. While this technique is generally accurate when detecting single velocity flow, it is subject to the production of false peaks when a number of different flow velocity components are present at the sample volume. Another two dimensional technique is shown in U.S. Pat. Nos. 4,930,513 and 5,048,528 in which successive lines of echoes are processed by two dimensional Fourier transformation. A two dimensional array of echo data is Fourier transformed as a function of Doppler frequency and RF frequency to yield an array of discrete Fourier transform sample points in the frequency domain. In this Fourier frequency domain, constant velocity Doppler spectral components are represented as radial lines and the transformed echoes are mapped as generally elliptical spread of sample points. To calculate velocity a radial projection is made through the major axis of the elliptical spread of points, with the angle of the radial projection being associated with the velocity of the target. While the two dimensional Fourier transformation technique is broadband in nature, it is also computationally intensive, a drawback in economical real-time systems. Moreover, the Fourier technique requires compound estimations, a Fourier transformation followed by a radial projection in Fourier space.

Other broadband processing techniques which have been proposed in the literature include maximum likelihood estimators which are based on a matched filter approach that takes into account all velocities present in the signal; interpolation methods which rely on a model of the expected correlation between RF echo lines and a few measured sampling intervals to estimate the mean time shift; and angle-independent velocity estimation techniques.

Broadband pulse techniques are subject to two further phenomena which can lead to inaccuracy in the estimation of the Doppler frequency shift. One is the attenuation of higher transmit frequencies as a function of tissue depth. This rolling off of the higher frequency content of received echoes with depth can result in a continual shifting of the center frequency of received echoes to lower frequencies as a function of the depth from which they were received. A second phenomenon is due to the coherent nature of ultrasonic waves. Echoes returning from scatterers in the vicinity of the target area can destructively interfere with each other, resulting in the elimination of components of the received signal spectrum. Components at the center frequency can undergo such cancellation, thereby distorting or changing the spectrum of the received echo signals. A Doppler processing system should provide a means for accurate determination of the actual center frequency of the echo signals emanating from the sample volume at every different sample volume in the color flow map, in spite of the effects of these phenomena.

In accordance with the principles of the present invention, a processing technique for pulsed Doppler echo information is provided which exhibits increased accuracy with broadband pulse transmission. A number of pulses are transmitted to a sample volume at regular sampling intervals $T_s$ and the received lines of echo signals are sampled as a function of depth, stored and operated upon in a two dimensional array format, where one dimension corresponds to depth and the other dimension corresponds to the pulse intervals. A two dimensional autocorrelation is then performed on the array in these two dimensions. The autocorrelation processing in the depth dimension yields a correlation function related to the mean center frequency $f_c$ of the echoes of the sample volume, and the autocorrelation processing in the pulse interval dimension yields a correlation function related to the mean Doppler shift frequency $f_D$. Mean axial velocity is then estimated using the analytically derived values of $f_c$ and $f_D$ in the Doppler velocity equation. The technique advantageously utilizes autocorrelation techniques efficiently applied to Doppler velocity estimation and overcomes the shortcoming of the time domain technique of false velocity peak estimation. In comparison with the autocorrelation approaches of the prior art, the present technique exhibits better performance under conditions of slow flow, better temporal and spatial resolution, and improved noise sensitivity.

For a number of years autocorrelation processing has been a primary technique for estimating Doppler frequency shifts utilized in color flow mapping. Autocorrelation processing is often preferred for computation-intensive color flow mapping in place of the fast Fourier transform (FFT) spectral estimation technique which has long been in use for Doppler measuring systems which preceded color flow mapping. The principles of autocorrelation processing of Doppler signals are well know. A narrowband (long duration) ultrasonic pulse is transmitted toward a target or discrete sample volume within the body. The echo signal returning from the sample volume is received and demodulated, usually into I and Q quadrature components. This transmit-receive sequence is followed by a number of like sequences separated from the first and from one another by time intervals $T_s$; the frequency of pulses at intervals $T_s$ is the pulse repetition frequency PRF. The group of pulses transmitted to a particular sample volume is called an ensemble, and the number of pulses in the group is referred to herein as the ensemble length. The signals from the sample volume are then processed by one dimensional autocorrelation in the sequence in which they were received. When represented by subscripts denoting the sequence of reception, the sequence would appear as $$I_1,Q_1\ I_2,Q_2\ I_3,Q_3 \ldots I_n,Q_n$$

Autocorrelation is then performed by multiplying adjacent samples in the sequence in complex conjugate form and summing the products to produce a result in the form of $I'+jQ'$. Mathematically, the process can be expressed as $$X' = \sum_{k=1}^{n-1} X_{k+1} \cdot X_k^*$$

where $X_k = I_k + jQ_k$ and n is the number of samples in the sequence. From the complex result the Doppler phase shift $\theta_D$ is calculated as the arc tangent of the quotient of $Q'$ and $I'$ or $$\phi_D = \tan^{-1}\frac{Q'}{I'}$$

The Doppler frequency shift $f_D$ is determined by dividing the phase shift $\theta_D$ by the product of the pulse interval $T_s$ and $2\pi$. The velocity of the target is then estimated from the Doppler velocity equation using the estimated value for $f_D$ and assuming $f_o$ to be the center frequency of the transmitted pulses.

The use of one dimensional autocorrelation processing is imprecise and limiting in several respects, however. Narrowband transmission pulses of long duration are employed to maintain, to as great a degree as possible, an equivalency between the pulse transmission frequency and the frequency of the echo pulses emanating from the target area. This enables one to ascribe minimal credence to the assumption of $f_o$ as being equal to the pulse frequency which actually insonifies the target. But due to depth dependent attenuation higher frequency components of the echo signal and the center frequency of the received echo signal frequencies are continually decreasing as echoes are received from greater and greater depths. Even at shallow depths the band of echo frequencies can exhibit irregularities in signal content due to coherent interference of signal components concurrently returning from a number of scatterers in the target area. These factors cast aspersions on the assumption of equality between the transducer frequency and the target insonification frequencies that actually reach the sample volume. When broadband, higher frequency content pulses are employed for greater resolution or compatibility with imaging pulse techniques, the dilemma is exacerbated. As the pulses are shortened and their bandwidth is broadened, the accuracy of the one dimensional autocorrelator deteriorates. Furthermore, the performance of one dimensional autocorrelation deteriorates significantly under noise conditions, particularly for small frequency shifts corresponding to low velocity flow. Moreover, the accuracy of one dimensional autocorrelation is dependent upon the use of a significant number of samples taken over an equal number of pulse intervals $T_S$. As the number of sampling intervals is reduced, the accuracy of the technique declines correspondingly. This limits the performance and flexibility of the frame rate and/or line density performance of the color flow mapping system.

An embodiment of the present invention overcomes these limitations by acquiring a two dimensional array of signal samples for a sample volume rather than a single sequence of samples. The two dimensions of the array are depth, or the sampling interval direction of the echo signals and the pulse time dimension, the direction of time intervals $T_S$. Two autocorrelation calculations are performed, one in each of these orthogonal dimensions of the array of signal samples. The autocorrelation in the pulse time dimension yields an autocorrelation function related to the Doppler frequency, and the autocorrelation in the depth dimension yields an autocorrelation function related to the frequency of the received echo signals. The two empirically determined frequencies are then employed in the Doppler velocity estimation to give an estimate of the velocity of motion at the given sample volume.

Unlike the one dimensional autocorrelation technique, the technique of the present invention preferably employs broadband transmit pulses compatible with those commonly employed in ultrasonic imaging. Because an embodiment of the present invention utilizes the full information present in the bandwidth of the received echo signal, its performance improves as the bandwidth is increased. Rather than assuming a constant value for the pulse insonification frequency, the autocorrelation in the depth dimension empirically estimates the true center frequency of the echo signals received from the sample volume in question. This estimation will account for any depth dependent frequency decline or coherent signal component cancellation. Moreover, an embodiment of the present invention will provide better slow flow performance and noise sensitivity as compared with equivalent one dimensional autocorrelation. Furthermore, the window of array samples can be varied in shape, as discussed below in greater detail, to offer performance tradeoffs in frame rate versus axial resolution while maintaining constant Doppler accuracy.

Mathematically, the present invention can be described as follows. A target area is interrogated with a number of transmitted pulses with a repetition interval of $T_S$. The line of echo signals returning after each pulse transmission is sampled at sampling intervals $t_s$, either in the RF frequency domain or after demodulation. Each line of samples is stored as one column of a two dimensional array store in parallel with the preceding received lines. The lines are aligned as a function of depth so that a row of samples across the columns will correspond to a common depth. This correspondence may be accomplished by maintaining a constant relationship between sampling times and depth of returning echoes for each line. The two dimensional array of samples will thus have orthogonal dimensions of the line sampling intervals $t_s$ and the pulse repetition intervals $T_S$.

The array is subdivided vertically into one or more windows of samples corresponding to the desired sample volume or volumes. The sample volume will thus be defined by the two dimensional array of samples in the window, which has the vertical dimension of samples in the depth dimension and the horizontal dimension of the number of lines acquired over the pulse repetition intervals $T_S$. The samples of the sample volume window are then operated upon by two orthogonal autocorrelations in the two dimensions to calculate the mean center frequency $f_c$ of the received echo signal and the mean Doppler shift frequency $f_D$ at the sample volume. The autocorrelations perform the operations $$R_{ts} = \int^T \int^t f^*(t,T) \cdot f(t + t_s, T) \, dt \, dT \text{ and}$$

$$R_{T_S} = \int^t \int^T f^*(t,T) \cdot f(t, T + T_S) \, dT \, dt$$

where $t_s$ is the autocorrelation spacing in the vertical or depth dimension and $T_S$ is the autocorrelation spacing in the horizontal or ensemble time dimension. Each resulting autocorrelation function can be expressed in complex notation having both real and imaginary terms.

The echo center and Doppler frequencies are then estimated by computing the arc tangents of the quotients of the respective imaginary and real terms of the correlation functions divided by the respective sampling interval:

$$f_c = tan^{-1}\{Im(R_{ts})/Re(R_{ts})\}/(2\pi t_s) \text{ and}$$

$$f_D = tan^{-1}\{Im(R_{T_S})/Re(R_{T_S})\}/(2\pi T_S)$$

The velocity of motion in the direction of pulse transmission at the sample volume is then estimated by using $f_c$ and $f_D$ in the velocity equation $v = c \cdot f_D/2 \cdot f_c$. If desired, angle correction may be employed in the estimation of off axis velocity as is well known in the art.

When the inventive technique is applied to demodulated signals, the demodulating frequency $f_{dem}$ must be added to the measured mean RF frequency to account for the demodulating frequency shift of $f_{dem}$. The full velocity equation would then be expressed as $$v = \{c/2\} \cdot \{tan^{-1}[Im(R_{T_S})/Re(R_{T_S})]/T_S\}/\{(2\pi f_{dem} + tan^{-1}[Im(R_{ts}))/Re(R_{ts})]/t_s\}.$$

Figure 1:
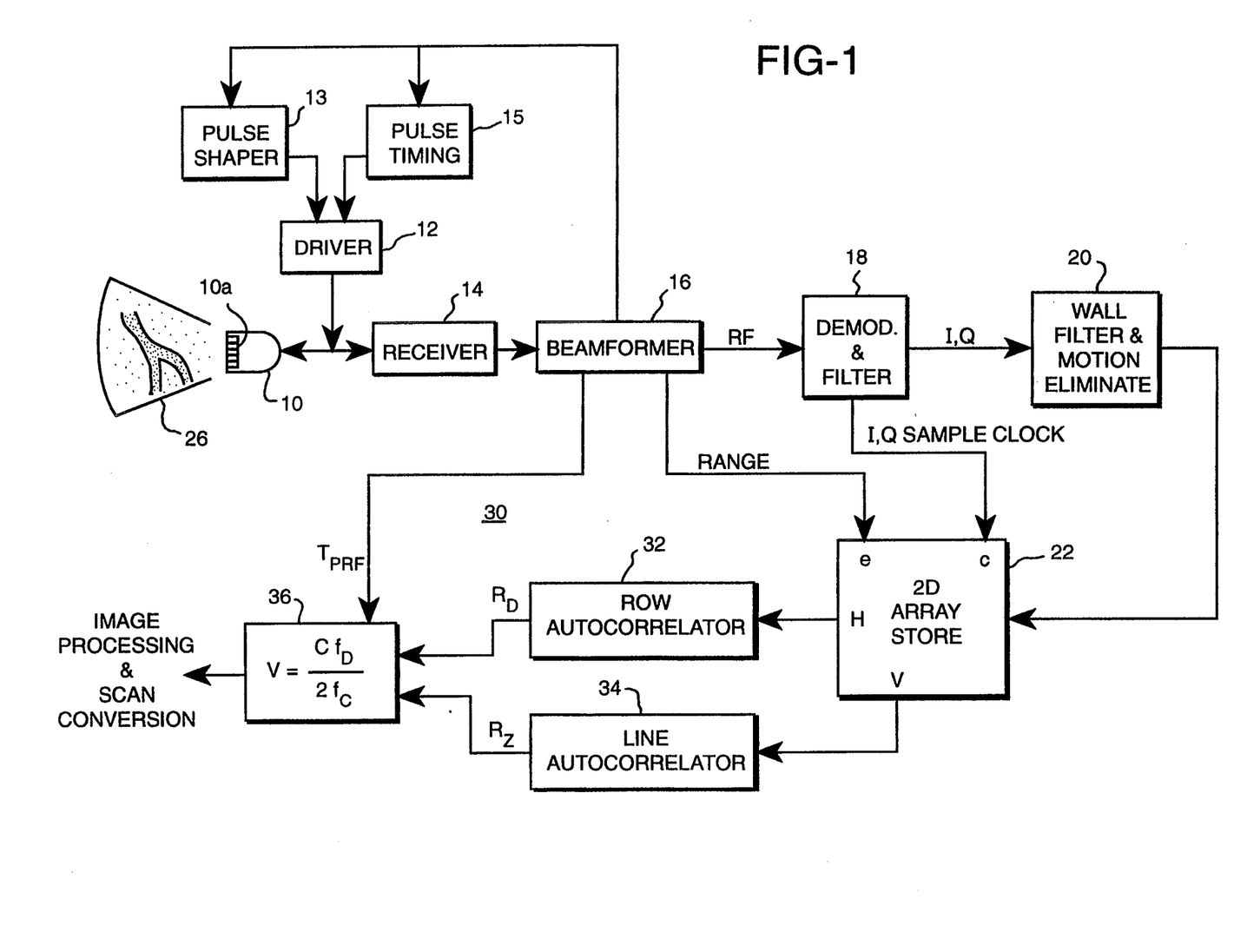
FIG. 1 illustrates in block diagram form a two dimensional Doppler autocorrelation processing system constructed in accordance with the principles of the present invention.
Figure 2:
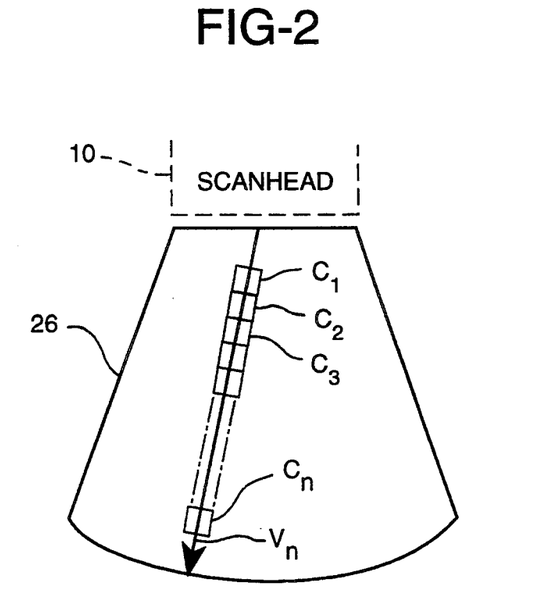
FIG. 2 illustrates the spatial location of sample volumes in a scan plane of a scanhead.

An ultrasonic signal processing system embodying the principles of the present invention is shown in block diagram form in FIG. 1. A scanhead 10 containing a multielement transducer 10a transmits ultrasonic pulses into a sector area 26 of the body of a patient. A driver 12 actuates the individual elements of the transducer at predetermined times designated by pulse timing circuitry 15 for the transmission of pulses of desired frequencies, lengths, and pulse shapes as designated by pulse shaper 13. The characteristics of pulse shaping and pulse timing are under control of a beamformer 16 such that pulses are appropriately shaped and steered along predetermined lines or vectors into the sector 26. FIG. 2 illustrates a spatial vector $V_n$ along which pulses are transmitted to insonify a sequence of sample volumes $C_1, C_2, C_3, \ldots C_n$ spatially located along that vector.

Echoes returning from the sample volumes in response to each pulse transmission are converted into electrical signals by the transducer 10a. The electrical echo signals are amplified and digitized into discrete echo samples by a receiver 14. The digitized echo signals are appropriately delayed, weighted and combined by the beamformer 16 to form a sequential line of coherent echo information samples from along the vector $V_n$ in response to each transmitted pulse.

The echo information samples produced by the beamformer 16 are initially at RF frequencies. The information is transformed into complex form by a demodulator and filter 18 which also demodulates the information to a lower frequency range. It should be noted that the principles of the present invention can be applied to demodulated Doppler information signals, or to undemodulated (RF) Doppler information signals using the analytic (complex) form of the RF signal; the utilization of demodulation in the illustrated embodiment is dictated by data handling requirements and other considerations not germane to the present invention. Since flow velocity information is often contaminated by artifacts of tissue motion and relative motional effects between the body and the scanhead, the sequence of echo information samples is initially processed by a wall filter and motion elimination processor 20. Details of the wall filter and motion elimination processor may be found in U.S. Pat. No. 5,197,477.

Each line of echo information samples taken along the spatial vector $V_n$ is stored in one vertical column of a two dimensional array store 22. A portion of the line sequence of samples may be designated as a unique sample volume by a depth dependent range gate signal enabling the array store, and the gated samples are clocked into the store 22 by an I,Q sample clock. The separate lines in the store 22 are aligned horizontally as a function of depth so that each horizontal row across the columns corresponds to samples taken from the same depth along the vector $V_n$. In a preferred embodiment the full line of samples is stored and later partitioned into sample volume ranges, and depth alignment is provided by sampling each returning line at the same depth dependent sampling times.

Figure 3:
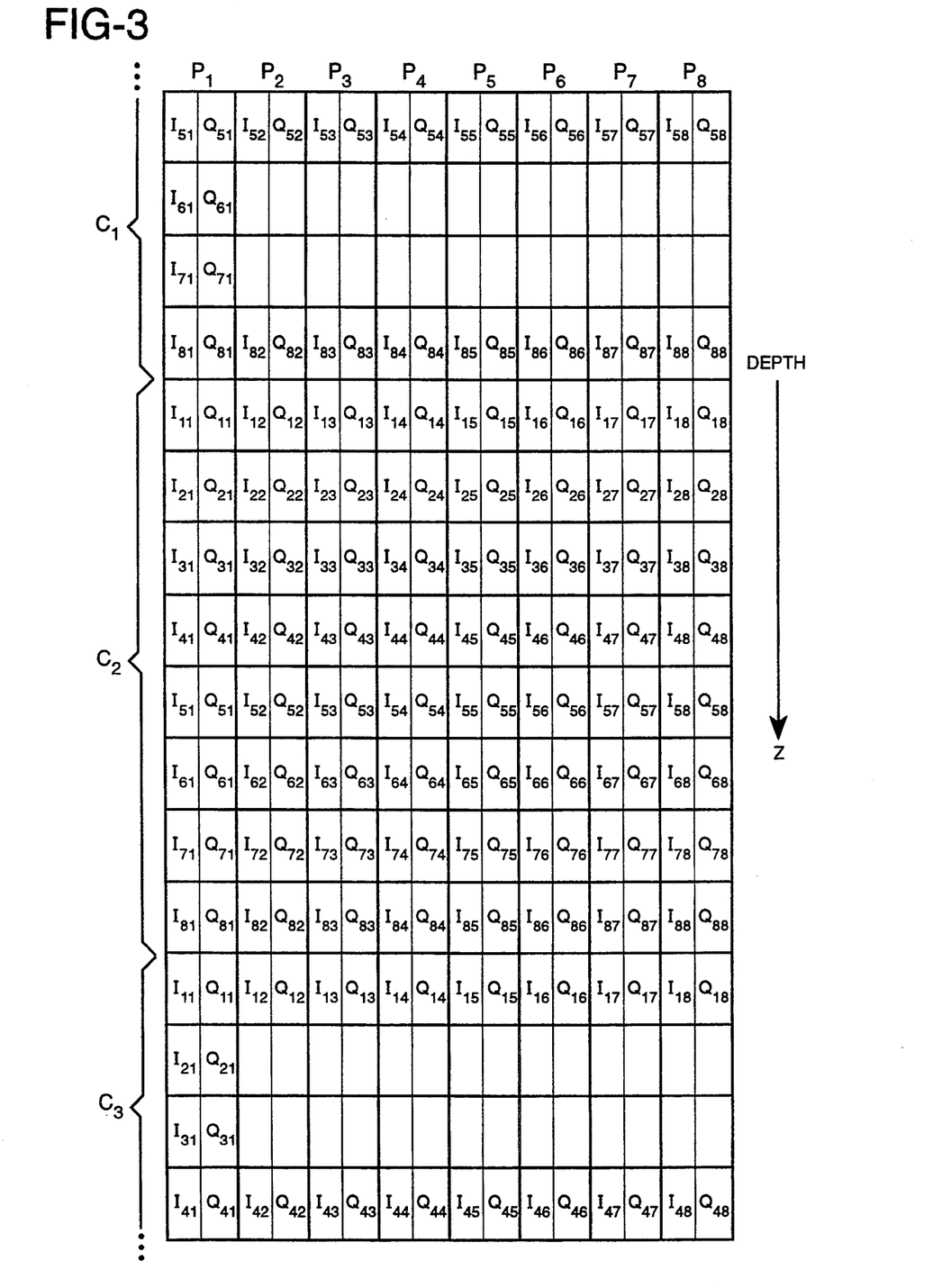
FIG. 3 is a two dimensional array of complex echo information samples from a number of interrogating pulse repetitions.

The samples taken from vector $V_n$ by separate pulses $P_m$ are stored in the two dimensional array store 22 as shown in FIG. 3. The store 22 spatially and temporally corresponds to the vector $V_n$ in that the vertical dimension of the store corresponds to depth along the vector and the horizontal dimension of the store corresponds to the pulse insonifications of the vector. In this example eight lines were acquired by the transmission of eight pulses numbered $P_1$ through $P_8$. The column of I and Q samples below each pulse number represents the samples taken for that particular line. The pulses were transmitted at pulse time intervals $T_s$. The samples down each column, which were acquired at increasing depths z along the vector $V_n$, were acquired by a sampling clock t by which each successive sample is separated in time from the previous one by sampling period $t_s$.

FIG. 3 shows a portion of the two dimensional array store 22 which has been partitioned into contiguous sample volumes. A portion of the samples of sample volumes $C_1$ and $C_3$ are shown, and the entire subarray of samples comprising sample volume $C_2$ is shown. Each sample has an I and a Q component with the same subscripts of the form $I_{yx}, Q_{yx}$ where y designates the line sampling time (at intervals $t_s$) and x designates the pulse number (m of $P_m$).

While the boundaries of the sample volumes are shown as being contiguous it should be understood that the sample volumes could be partitioned to overlap. For instance the upper eight samples in the array of FIG. 3 could comprise sample volume $C_1$, the lower eight samples could comprise sample volume $C_3$, and the middle eight samples could comprise sample volume $C_2$ (which thus overlaps the lower half of $C_1$ and the upper half of $C_3$.) In the illustrated partitioning of FIG. 3, sample volume $C_2$ is seen to be a two dimensional window of samples having a vertical dimension which is depth and a horizontal dimension which is the pulse time. The $C_2$ window is seen to be an eight by eight array of sixty-four samples.

The samples of the $C_2$ window are used to estimate the velocity of flow at the sample volume $C_2$ by performing two dimensional autocorrelation. A row autocorrelator 32 operates upon the samples in the $C_2$ window to determine an autocorrelation function for the Doppler frequency shift as expressed by $$R_{c_L, v_n}(0, T_s) = \sum_{i=1}^{WL} \sum_{k=1}^{EL-1} f^*_{c_L, v_n}(i,k) \cdot f_{c_L, v_n}(i, k+1)$$

where WL is the length of the $C_2$ window (expressed as the general case, $C_L$) in the depth dimension and EL is the number of samples in the time, or ensemble length dimension. The index k counts pulses transmitted in the direction of the vector $v_n$ and the index i counts samples in the depth dimension of the sample volume $C_L$.

In a similar manner a line autocorrelator 34 operates upon the sixty-four samples in the $C_2$ window to determine an autocorrelation function for the pulse frequency of the sample volume. This second autocorrelation can be expressed as $$R_{c_L, v_n}(t_s, 0) = \sum_{k=1}^{EL} \sum_{i=1}^{WL-1} f^*_{c_L, v_n}(i,k) \cdot f_{c_L, v_n}(i+1, k)$$

In essence, the row autocorrelator 32 forms products of adjacent or uniformly spaced samples in each horizontal row of the array, the number of such products per row being one less than the number of samples employed. The product terms of each row are summed and these sums are accumulated from all the rows to yield the a first autocorrelation function. Correspondingly, the line autocorrelator 34 forms products of adjacent or uniformly spaced samples in each vertical column of the array, the number of such products per column being one less than the number of samples employed. The product terms of each column are summed and these sums are accumulated from all columns to yield a second autocorrelation function. If desired, the signal samples applied to the autocorrelators can be weighted to further shape the response, as by spatially weighting samples toward the center of the window more greatly than samples at the perimeters.

Each autocorrelation function is in complex form $I + jQ$, having both a real and an imaginary term. In velocity processor 36 the Doppler shift frequency $f_D$ and the echo center frequency $f_c$ are calculated by computing the arc tangent of the quotient of the imaginary and real terms, divided by the appropriate sampling interval:

$$f_D = \tan^{-1}\{Im(R_D)/Re(R_D)\}/(2\pi T_s) \text{ and}$$

$$f_c = \tan^{-1}\{Im(R_2)/Re(R_2)\}/(2\pi t_s)$$

From these frequency values the velocity processor 36 estimates the velocity at the sample volume $C_2$ from $v = c \cdot f_D/2f_c$. The estimated velocity value for the sample volume $C_2$ is then made available for subsequent processing and image formation.

It may be desirable for certain applications that the autocorrelations be computed for higher order lags than single increment sample spacing. The generalized expression for higher order lags in determining the Doppler frequency shift can be expressed as $$R_{c_L,v_n}(0, PT_s) = \sum_{i=1}^{WL} \sum_{k=1}^{EL-P} f^*_{c_L,v_n}(i,k) \cdot f_{c_L,v_n}(i,k+P)$$

where the term P represents the incremental spacing of the higher order lag. The expression for computing pulse frequency with a higher order lag would correspondingly show the additional increment in the depth dimension.

In the conventional one dimensional autocorrelation velocity estimator the accuracy of the estimation is determined principally by the number of pulses in the ensemble of pulses interrogating the sample volume. Each pulse and consequent sample adds another sample to the sequence of samples upon which autocorrelation is performed. Increase the number of pulses in the ensemble and accuracy improves; decrease the number of pulses and accuracy decreases. Increased accuracy is seen to come, however, at the expense of greater acquisition time, resulting in slower frame rates.

Figure 4A:
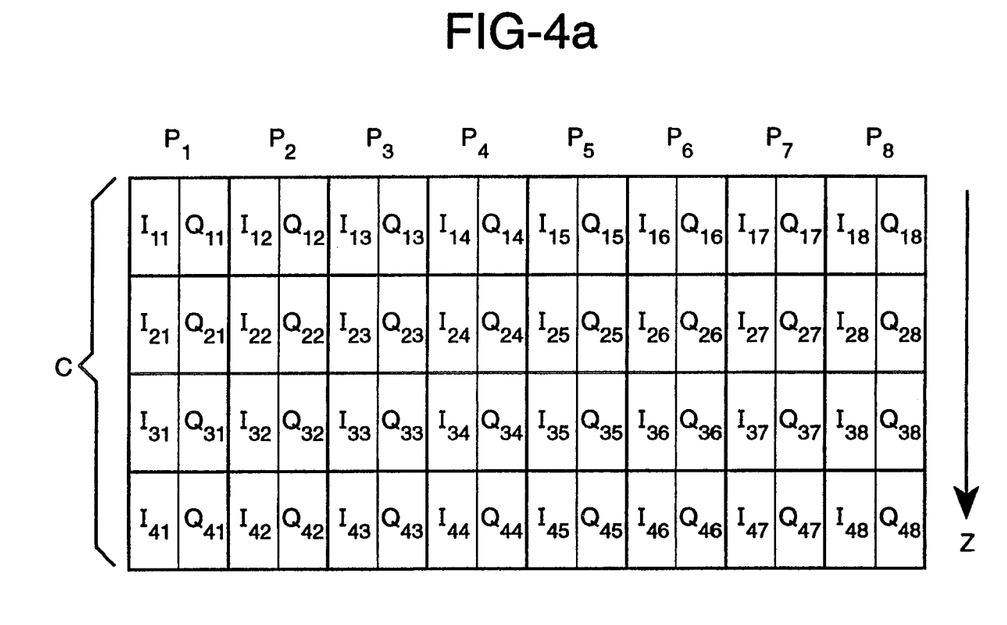
FIGS. 4a and 4b illustrate signal sample array windows which provide differing spatial and temporal resolution when processed in accordance with the principles of the present invention.
Figure 4B:
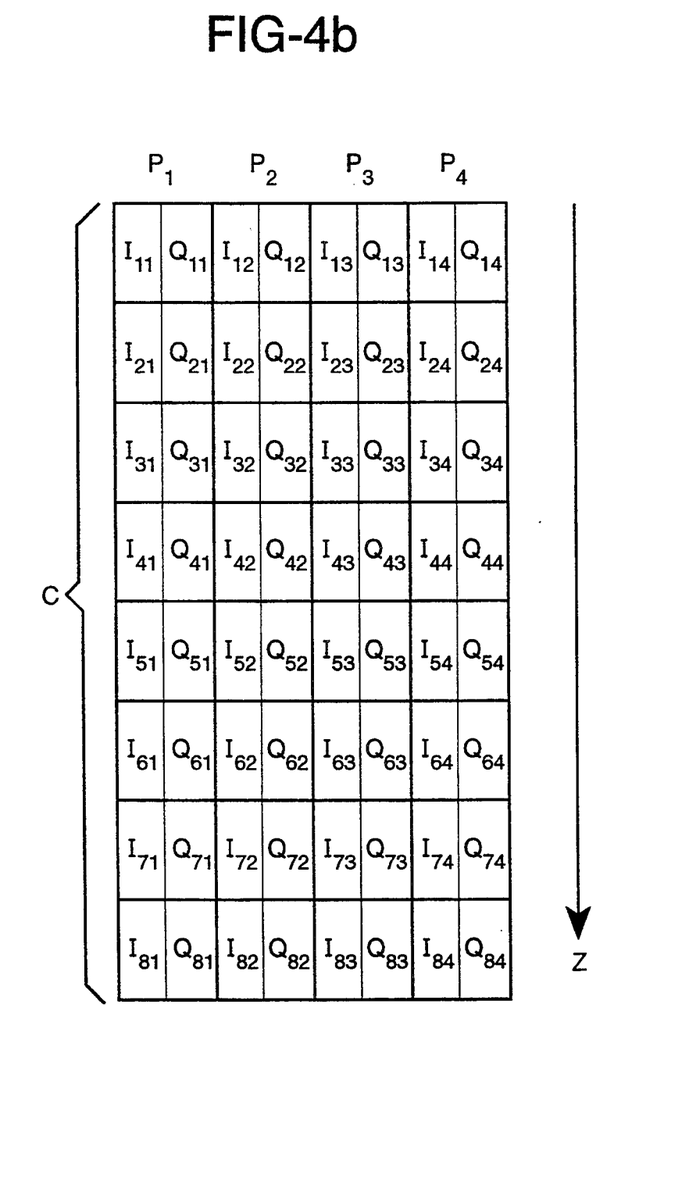

With two dimensional autocorrelation processing, however, tradeoffs in temporal and spatial resolution can be made without sacrificing the accuracy of velocity estimation. This is because accuracy is determined by the number of samples in the sample volume window, not solely by the pulse ensemble length. Thus, the shape of the window can be tailored to meet particular performance requirements. FIGS. 4a and 4b illustrate two different sample windows for a sample volume C. The sample window of FIG. 4a has four samples in the depth dimension along each line and was acquired in eight lines in response to eight pulse transmissions. The sample window of FIG. 4b has eight samples in the depth dimension and was acquired in four pulse intervals. A color flow map composed of sample volume windows such as that of FIG. 4a will have greater spatial resolution than that of FIG. 4b by reason of the smaller size of the sample length in the depth dimension. A color flow map composed of sample volume windows such as FIG. 4b will have greater temporal resolution than that of FIG. 4a by reason of the fewer pulse transmission, resulting in a higher frame rate. In each case a tradeoff has been made favoring either spatial or temporal resolution. The accuracy of the velocity estimate from each window is the same, however, as the number of samples in each window is a constant.

The two dimensional autocorrelation technique of the present invention can offer improved accuracy and noise performance in comparison with conventional one dimensional Doppler autocorrelation by reason of the fact that the inventive technique utilizes the full information present in the bandwidth of the received echo signals. Unlike one dimensional autocorrelation, the accuracy and noise performance of the technique of the present invention improves with broader band pulses. In comparison with two dimensional Fourier transformation, the two dimensional autocorrelation technique is less sensitive to noise, does not require two sequential estimations (Fourier transformation followed by radial projection), and is less computationally intensive. Accordingly it is better suited to color flow mapping and M mode Doppler applications than either prior art technique.

One skilled in the art will recognize that alternative analytic techniques may be used to operate upon the two dimensional array of samples of FIG. 3, 4a or 4b in order to calculate estimates of the RF frequency and Doppler shift terms. For instance, one could apply an analytic technique which calculates instantaneous phase change from sample to sample in the array such as by measuring the instantaneous phase at each sample, taking differences between adjacent sample phases across each row, accumulating the differences, and averaging the accumulation to compute an estimate of Doppler shift. Likewise, differences are taken between adjacent sample phases down each column, these differences are accumulated and averaged, and an estimate of RF frequency is computed. The estimates from the array of Doppler shift and RF frequency are then used in the velocity equation to calculate a velocity at the sample volume from which the array of samples was acquired.

What is claimed is:

1. Ultrasonic diagnostic apparatus for estimating flow velocity at a sample volume by Doppler estimation comprising:

means for repetitively insonifying said sample volume with pulses of ultrasonic waves;

means for acquiring ultrasonic echo information as a function of depth from insonifications of said sample volume;

means for performing two dimensional autocorrelation of said ultrasonic echo information corresponding to depth and insonification repetition; and means responsive to said autocorrelation means for producing a velocity estimate.

2. The ultrasonic diagnostic apparatus of claim 1, wherein said two dimensional autocorrelation means produces autocorrelation functions related to Doppler frequency and insonification wave frequency.

3. The ultrasonic diagnostic apparatus of claim 2, wherein said velocity estimate means utilizes said Doppler frequency and insonification wave frequency autocorrelation functions in the production of a velocity estimate.

4. Ultrasonic pulse-echo apparatus for interrogating a field within the body comprising:

means for acquiring a two dimensional array of ultrasonic echo samples related to a location within said field, wherein a first dimension corresponds to echo samples received over time in response to a transmitted ultrasonic pulse and a second dimension corresponds to echo samples received in response to a plurality of pulses transmitted over time;

means for performing an autocorrelation of said samples of said array in said first dimension to yield a first correlation function related to echo frequency;

means for performing an autocorrelation of said samples of said array in said second dimension to yield a second correlation function related to Doppler shift; and means responsive to said autocorrelation functions for determining velocity of motion at said location.

5. The ultrasonic pulse-echo apparatus of claim 4, wherein said transmitted ultrasonic pulses are relatively broadband.

6. The ultrasonic pulse-echo apparatus of claim 5, further comprising means for transforming received echo signals into analytic (complex) form.

7. The ultrasonic pulse-echo apparatus of claim 6, wherein said acquiring means further comprises means for acquiring ultrasonic echo samples in said first dimension separated by line sampling intervals $t_s$, and means for acquiring ultrasonic echo samples in said second dimension separated by pulse repetition intervals $T_s$.

8. The ultrasonic pulse-echo apparatus of claim 7, wherein said first dimension autocorrelation means utilizes an autocorrelation spacing of $t_s$, and wherein said second dimension autocorrelation means utilizes an autocorrelation spacing of $T_s$.

9. Ultrasonic pulse-echo apparatus for interrogating a field within the body comprising:
 means for acquiring a two dimensional array of ultrasonic echo samples related to a location within said field, wherein a first dimension corresponds to depth within said field and a second dimension corresponds to the ensemble length of a plurality of pulses transmitted to said location;
 means for performing an autocorrelation of said samples of said array in said first dimension to yield a first correlation function related to echo frequency;
 means for performing an autocorrelation of said samples of said array in said second dimension to yield a second correlation function related to Doppler shift; and
 means responsive to said autocorrelation functions for determining velocity of motion at said location.

10. The ultrasonic pulse-echo apparatus of claim 9, wherein said acquiring means further comprises means for acquiring ultrasonic echo samples as a function of depth at sampling intervals $t_s$, and means for acquiring ultrasonic echo samples in said second dimension at the time intervals $T_s$ separating said ensemble of pulses.

11. The ultrasonic pulse-echo apparatus of claim 10, wherein said first dimension autocorrelation means utilizes an autocorrelation spacing of $t_s$, and wherein said second dimension autocorrelation means utilizes an autocorrelation spacing of $T_s$.

12. Ultrasonic pulse-echo apparatus for interrogating a field within the body comprising:
 means for acquiring a two dimensional array of ultrasonic echo samples related to a location within said field, wherein columns of samples of said array corresponds to depth within said field and rows of samples of said array correspond to the ensemble length of a plurality of pulses transmitted to said location;
 means for performing an autocorrelation of said samples of said array by forming products of uniformly spaced samples in each column and summing said products to yield an autocorrelation function related to echo frequency;
 means for performing an autocorrelation of said samples of said array by forming products of uniformly spaced samples in each row and summing said products to yield a second autocorrelation function related to Doppler shift; and
 means responsive to said autocorrelation functions for determining velocity of motion at said location.

13. The ultrasonic pulse-echo apparatus of claim 12, wherein said acquiring means further comprises means for acquiring ultrasonic echo samples as a function of depth at uniformly spaced sampling intervals $t_s$, and means for acquiring ultrasonic echo samples in said rows at uniformly spaced time intervals $T_s$ separating said ensemble of pulses.

14. The ultrasonic pulse-echo apparatus of claim 13, wherein said acquiring means further comprises means for relatively weighting said samples prior to autocorrelation.

15. The ultrasonic pulse-echo apparatus of claim 14, wherein said weighting means gives relatively greater weight to samples in the center of said array.

16. The ultrasonic pulse-echo apparatus of claim 13, wherein said uniform sample spacing of one of said autocorrelation means exhibits a higher order lag than the corresponding sample spacing of said acquiring means.

17. Ultrasonic diagnostic apparatus for estimating flow velocity at a sample volume at a depth within the body by Doppler estimation comprising:
 means for repetitively insonifying said sample volume with pulses of ultrasonic waves;
 means for acquiring a two dimensional array of ultrasonic echo information samples as a function of depth and insonification time from said repetitive insonifications of said sample volume;
 means for analytically operating upon said array of samples in the dimension representative of insonification time to compute an estimate of the Doppler shift;
 means for analytically operating upon said array of samples in the dimension representative of depth to compute an estimate of the frequency of the insonifying pulses; and
 means for utilizing said Doppler shift and insonifying pulse frequency estimates to compute a velocity estimate.

18. The ultrasonic diagnostic apparatus of claim 17, wherein at least one of said analytically operating means calculates phase shift information in its dimension.

19. The ultrasonic diagnostic apparatus of claim 18, wherein each of said analytically operating means calculates phase shift information in a different orthogonal dimension of said array of samples.

* * * * *